April 19, 1960 G. L. FREDENDALL 2,933,554

COLOR TELEVISION

Filed Sept. 1, 1954 2 Sheets-Sheet 1

INVENTOR.
Gordon L. Fredendall
BY
[signature]
ATTORNEY

April 19, 1960 G. L. FREDENDALL 2,933,554

COLOR TELEVISION

Filed Sept. 1, 1954 2 Sheets-Sheet 2

INVENTOR.
Gordon L. Fredendall
BY
[signature]
ATTORNEY 2,933,554
Patented Apr. 19, 1960

2,933,554

COLOR TELEVISION

Gordon L. Fredendall, Huntingdon Valley, Pa., assignor to Radio Corporation of America, a corporation of Delaware Application September 1, 1954, Serial No. 453,629

8 Claims. (Cl. 178—5.4)

The present invention relates to color television image-reproducing apparatus and, more particularly, to new and improved apparatus for reproducing color images in a simplified manner.

There has heretofore been proposed various forms of single gun color image reproducing kinescopes some of which, for example, include a target made up of a plurality of triads of phosphor strips, the strips of each triad being adapted to emit light of the respectively different component colors when struck by electrons. One problem associated with the latter type of color image-reproducing device has been that of providing satisfactory "black and white" images.

In view of the desire for improving black and white rendition by color television image reproducers, there have additionally been proposed color image tubes having, in addition to an individual electron beam for each of the component colors, a so-called brightness or "black-and-white" image developing beam which is adapted to strike only a white light-emitting phosphor material forming a part of the target screen. Such tubes present the usual problems of a multi-beam device and, additionally, require special target structures.

Hence, it is a primary object of the present invention to provide new and improved color image-reproducing apparatus.

Another and more specific object of the invention is that of providing color image-reproducing apparatus, which apparatus is capable of providing increased image brightness along with faithful color reproduction.

In general, the present invention contemplates the provision of a color image reproducer in the form of a cathode ray tube having a first electron beam adapted to produce the component colors of a television image and a second electron beam for reproducing the black-and-white portions of such image. Means are provided for modulating the first-recited beam with signals representative of the component colors to be reconstructed, with means for modulating the second beam with the black-and-white information.

In accordance with a specific embodiment of the invention as described herein, the target may be in the form of a phosphor strip arrangement in which the strips are disposed horizontally (i.e., in the direction of scan). With such a target, the "color" image developing beam is caused to scan respectively different color phosphors successively, while the "white" image developing beam is caused to impinge upon all three of the respectively different color phosphor strips of a given triad simultaneously.

By virtue of the novel arrangement of the present invention, improved brightness of images may be had and without resort to complex target structures involving "white" phosphor material in addition to the several color phosphors. Moreover, since one of the beams is normally intended to cover all three color phosphors at all times, the problems of convergence and the like which are inherent in certain prior art arrangements are substantially minimized.

Additional objects and advantages of the present invention will become apparent to those skilled in the art from a study of the following detailed description of the accompanying drawing, in which.

Figures 1, 2:
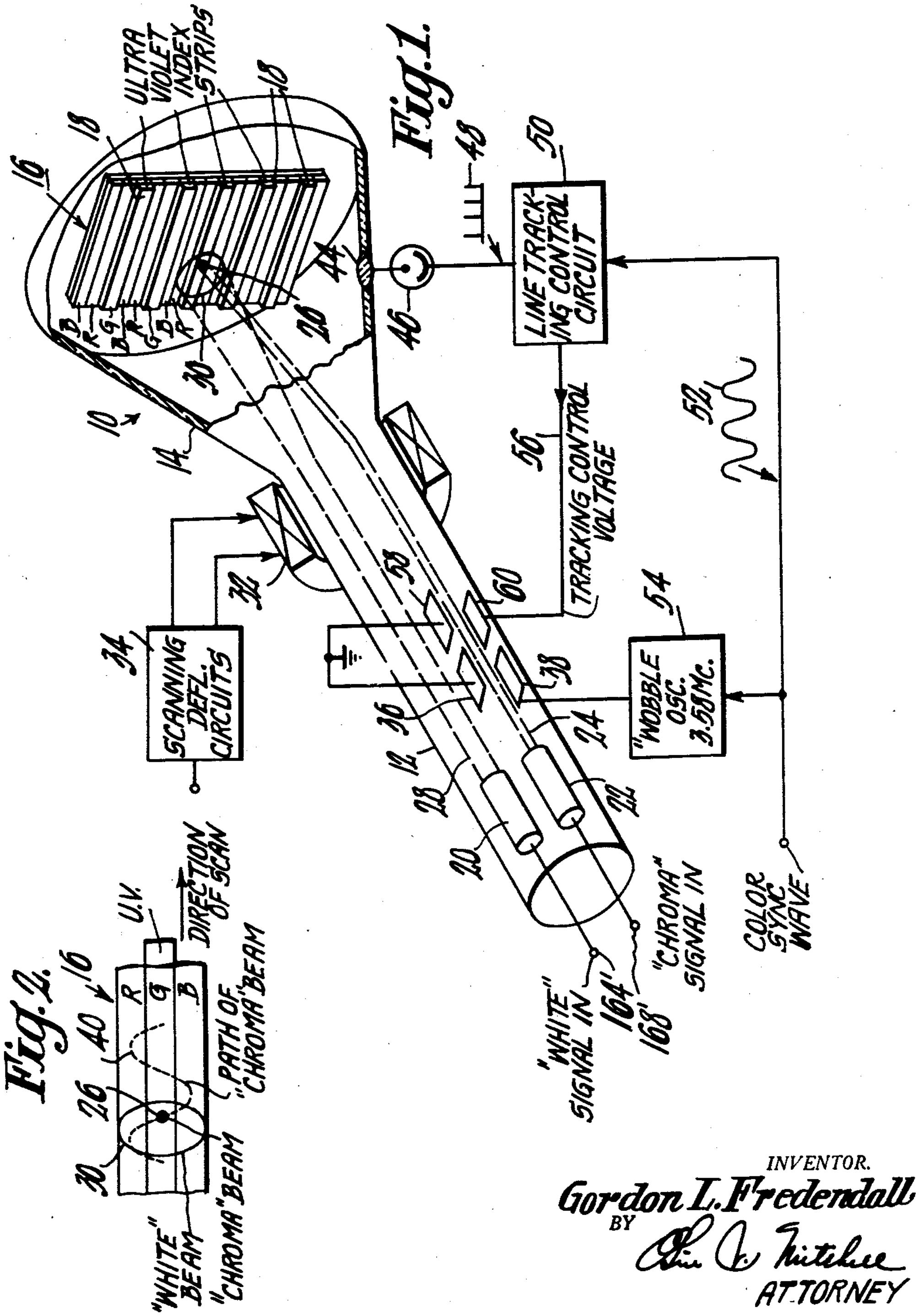
Fig. 1 illustrates a color image-reproducing cathode ray tube in accordance with the invention, together with certain apparatus for operating the same.
Fig. 2 is an enlarged, diagrammatic showing of a portion of the tube of Fig. 1 illustrating its operation.

Referring to the drawing and, in particular, to Fig. 1 thereof, there is shown a cathode ray tube 10 comprising a cylindrical neck portion 12 and a flared "cone" or "bulb" 14. At the large end of the cone 14 is a target structure 16 comprising a plurality of triads of respectively different color phosphor strips arranged horizontally and with the strips of successive triads following the same sequence (e.g., R, G, B, R, G, B). One strip (viz. the green strip) of each of the triads is provided with a layer 18 of material capable of emitting ultra-violet light in response to electron impingement. Such a target structure is well-known in the art and does not require further description.

Supported within the cylindrical neck portion 12 of the tube 10 are two electron guns 20 and 22, each of which will be understood as comprising a source of electrons, an intensity control electrode and focusing and accelerating means. The beam from each of the guns 20 and 22 is thus directed toward the target 16 in the usual manner. The electron gun 22 will be designated herein as that adapted to reproduce the component color information of a color television image, such that the beam 24 produced thereby is caused to focus at the target 16 to form a spot 26 whose diameter is not greater than the vertical dimension of one of the phosphor strips R, G and B.

The electron gun 20 produces a beam of electrons 28 which is larger in cross-sectional area than the beam 24 and, specifically, of such size that it produces a spot 30 at the screen of such diameter that it simultaneously impinges upon all three of the phosphor strips of a single triad. That is, assuming that the beam 28 is circular in cross section, the diameter of the spot 30 at the target will be substantially equal to the vertical dimension of a single triad of phosphor strips. Both the color and white beams 24 and 28 are subjected in their transit toward the screen 16 to the action of scanning deflection means, indicated diagrammatically as an electromagnetic deflection yoke 32, which may take the conventional form of two pairs of coils arranged at right angles to each other and energized, respectively, with suitable sawtooth currents of television field and line frequencies from a source 34. The action of the deflection yoke 32 is, therefore, that of causing the two beams 24 and 28 to scan a convention rectangular raster on the target screen 16. During such scansion, the beam 28 bearing the white information will successively scan the phosphor triads, thereby producing horizontal lines of white light. The color or chroma beam 24, on the other hand, and in order to perform its function of component color illumination, is subjected to a high frequency wobble. Specifically, in accordance with one form of the invention, the beam 24 passes between a pair of vertically displaced deflection plates 36 and 38 in its transit toward the target. The plates 36 and 38 are supplied with a high frequency voltage of, for example, 3.58 mc, so that the beam 24 is caused to describe a generally sinusoidal pattern on the target, passing over the phosphor strips successively to illuminate them in the following sequence;

green, red, green, blue, green, red, green, blue green. The sinusoidal pattern of the chroma beam spot 26 is shown clearly in Fig. 2 by the dotted line 40. While the chroma beam is following its sinusoidal path along the phosphor strips R, G, and B of a given triad, the white beam spot 30 is scanning horizontally along the same triad and illuminating all three strips thereof.

From the foregoing, it will be recognized that, with the beams 24 and 28 scanning the target 16 as described, the white beam 28 may be suitably modulated with signals representative of the black-and-white content of an image and the chroma beam 24 may be modulated in such manner that it successively illuminates the red, green, and blue phosphors in an amount dependent upon the presence of those representative colors in the image.

In order to insure proper tracking of the respectively different color phosphor strips by the electron beam 24, a tracking arrangement of any suitable form may be provided. In Fig 1, therefore, the cone portion 14 of the cathode ray tube includes a window 44 adapted to pass ultra violet light which is emitted by the layers 18 in response to electron excitation. By virtue of the sinusoidal path of the chroma beam 24, it will excite the ultra violet strip of a given triad each time it crosses the green phosphor (i.e., both on its up and down movements). Each such traverse of an ultra-violet strip will produce ultra-violet light which passes through the window 44 for impingement upon the light-sensitive electrode of a photo-multiplier tube 46 or other light-responsive device. The output of the tube 46 will, therefore, comprise a series of pulses 48 occurring, in time, in coincidence with the traversal of the ultra-violet strip 18 by the chroma beam 24. Since the white beam 28 is continuously upon one of the green phosphor strips which bears an ultra-violet light 18, the effect thereof does not interfere with the sensing action of the tube 46 but merely adds a fixed bias to its output current. The output of the tube 46 is applied to a line-tracking control circuit 50 which, for example, comprises a suitable phase detecting circuit for comparing the phase of the pulses 48 with that of the wobble voltage being applied to the wobble plates 36 and 38. Thus, the tracking control circuit 50 is illustrated as receiving some of the 3.58 mc. wobble wave 52 which is employed in producing the wobulation of the beam 24 through the agency of the oscillator 54. The tracking control circuit 50 is adapted to provide at its output lead 56 a direct current "error" voltage which, when applied to a pair of position-correcting plates 58 and 60, corrects the vertical position of the beam 24 so that the "axis" of the sinusoidal path traced by the beam is coincident with the ultra-violet light-emitting layer 18. The line-tracking control apparatus does not per se form a part of the present invention, so that it will be understood that any suitable circuitry for performing its function may be employed.

Figure 3:
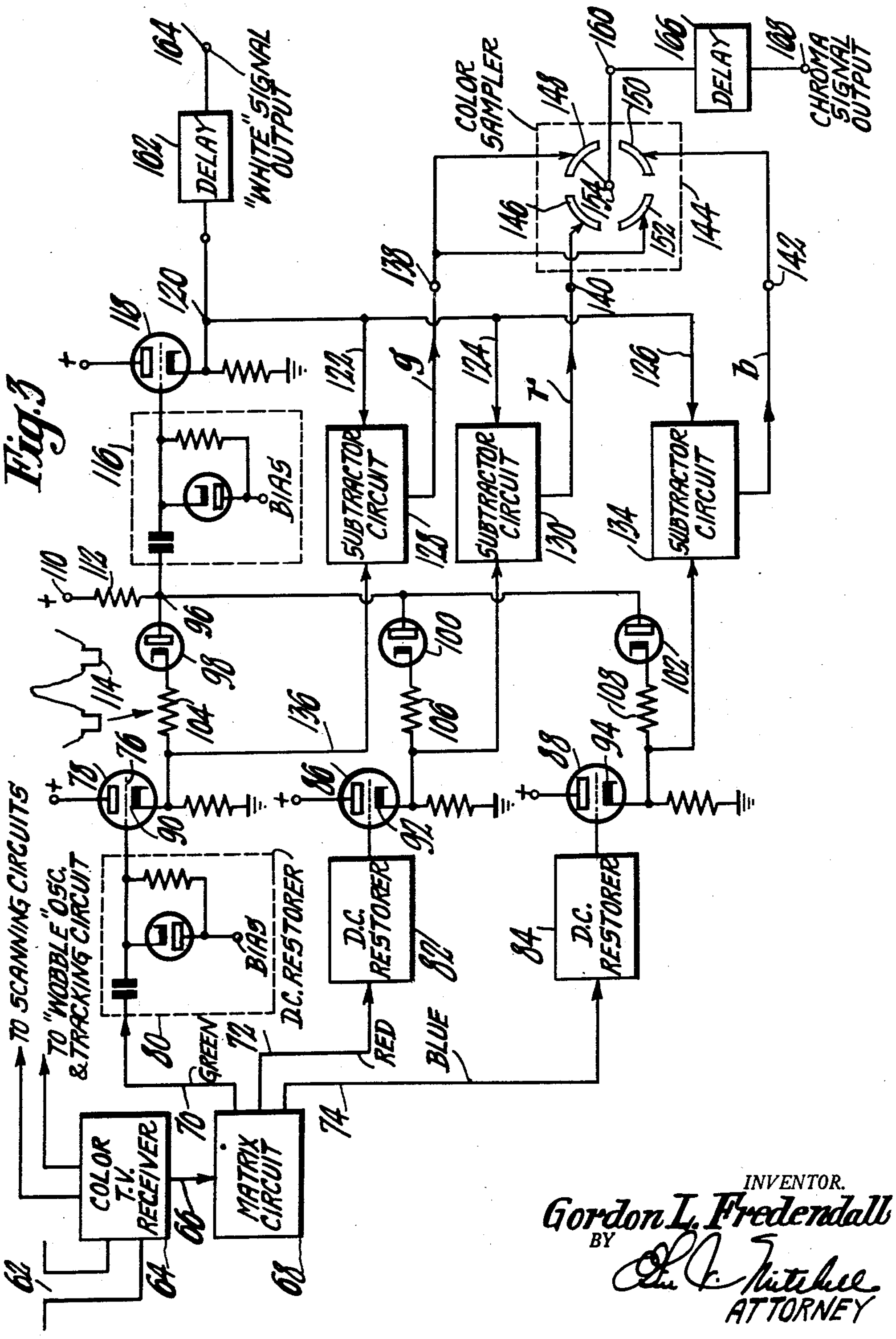
Fig. 3 is a block and schematic circuit diagram of a color television receiver which may be employed in deriving the proper signals for application to the apparatus of Fig. 1.

For proper operation of the image-reproducing apparatus of Fig. 1, it is desirable to modulate the representative white and chroma electron beams 28 and 24 with signals other than the usual brightness video and component color video signals such as are normally derived in color television receivers. That is, since both a white and a chroma beam are employed, it is desirable to avoid redundancy of the information "carried" by those beams. Hence, it has been found that one correct mode of modulating the intensity of the beams 24 and 28 is an arrangement for exciting a white reproducer in accordance with the lowest amplitude color signal together with means for exciting each of a plurality of different color reproducers with a signal equal to the amplitude difference between the signal applied to excite the white reproducer and the signal representative of the color produced by that particular color reproducer. Additional information concerning the apparatus and the operation of such apparatus is well shown and described in U.S. Patent No. 2,684,995 granted July 27, 1954 to A. C. Schroeder. A color television receiver adapting the above-described arrangement for use with the apparatus of Fig. 1 is illustrated diagrammatically in Fig. 3. In Fig. 3, color television signals, which may be of the presently standardized variety, are intercepted by an antenna 62 and applied to the input terminals of a color television receiver 64. It will be understood that the receiver block 64 may include the usual radio frequency, mixer, intermediate frequency and video detector stages. The output signal of the receiver portion 64 is applied via a lead 66 to a conventional matrix circuit 68 which provides at its output terminals 70, 72 and 74, respectively, the green, red and blue representative video signals. One suitable receiver capable of performing the function thus far described in connection wtih the blocks 64 and 68 is described in detail in "Practical Color Television for the Service Industry," Revised Edition, published April 1954 by the RCA Service Co., Inc.

Each of the green, red and blue signals is applied to a direct current restoration circuit in order that the several signals may be clamped to the same reference level for the succeeding operations which are performed upon them. Thus, the green signal from the lead 70 is applied to the control electrode 76 of a cathode follower tube 78 after its direct current component has been established by the restorer of circuit 80, which is of conventional form. Similarly, the red and blue video signals are acted upon by D.C. restorers 82 and 84 and are applied, respectively, to the control electrodes of cathode followers 86 and 88. The cathodes 90, 92 and 94 of the cathode followers are connected to a common junction 96 by means of similarly polarized diodes 98, 100 and 102, the diodes being in series with resistors 104, 106 and 108. The common junction point 96 is connected to a point 110 of fixed positive potential via a resistor 112. Since the polarization of the diodes 98, 100 and 102 depends upon the polarity of the signals furnished by the cathode followers, it will herein be assumed that the signals applied to the diodes are of such polarity that signals of increased brightness extend in the positive direction. The diodes and their biasing means serve to select that color signal which has the lowest amplitude, and in the following manner: when no color signals are present the diodes will all conduct the same amount, which corresponds to the condition existing during "blanking" periods 114. As the amplitude of a given color signal increases the potential applied to the cathode of the corresponding diode becomes increasingly positive so that the diode to which the lowest amplitude color signal is applied conducts the most and the potential of all of the diode anodes drops to a value which is above that of the lowest amplitude color signal. Since this latter value is less than the other color signal amplitudes, the other color signals cannot pass to the junction 96. When, on the other hand, all of the three color signals are equal, as in a white portion of an image, all three diodes conduct equally. Conversely, if only a single color signal is present, it is prevented from reaching the junction 96 by reason of the fact that the other two signals are of zero amplitude.

The signals appearing at the junction 96 are coupled via a D.C. restorer circuit 116 to the control electrode of a cathode follower output amplifier 118 at whose cathode terminal 120 there is available what will be termed herein as the "white" video signal (i.e., that color signal of lowest amplitude). The signal from the terminal 120 is applied via leads 122, 124 and 126 to the input terminals of subtractor circuits 128, 130 and 134, respectively. Additionally, the output of the green cathode follower 78 is applied to the subtractor 128 via a lead 136 and the red and blue signals from the cathode followers 86 and 88 are applied, respectively, to the subtractors 130 and 134. Since subtractor circuits are well known in the art, they need not be described in detail here. It will be noted, however, that the output of the subtractor 128 appearing at the terminal 138 will be equal to the difference between the green video signal and the amplitude of the lowest color signal which appeared at the terminal 120. In a similar manner the subtractors 130 and 134 will provide at their output terminals 140 and 142, respectively, the difference between the red and blue signals and the lowest amplitude color signal.

As will be understood from the description of the apparatus of Fig. 1 in which the chroma electron beam 24 traverses a green phosphor strip twice as often as it does each of the red and blue strips, it is necessary to "sample" the green video signal at the terminal 138 twice as often as is done for either of the other color signals. In the interest of simplicity of illustration, the color signals "*g*," "*r*" and "*b*" are applied to a sampling arrangement comprising a mechanical commutator 144 which comprises four equal conductive sectors 146, 148, 150 and 152 and a rotatable member 154 which is adapted to contact the sectors in succession and at a rate determined by the frequency of the wobble applied to the beam 24 in Fig. 1. One convenient frequency, as noted supra in connection with the wobble oscillator 54, is the subcarrier wave frequency employed conventionally in accordance with present-day standards whereby color television information is transmitted by means of a subcarrier wave whose instantaneous phase with respect to a reference is representative of image hue and whose instantaneous amplitude is representative of saturation. The frequency of that subcarrier wave may, as illustrated herein, be equal to 3.58 mc. While not shown, therefore, it will be understood that the commutator 144 for sampling the wave color video signals is synchronized with the subcarrier wave frequency applied to the receiver 64, in a suitable manner. As will be noted, the green video signals are applied to both sectors 148 and 152 of the sampling commutator 144, so that the sequence at which the color signals are available at the terminal 160 will be as follows: *g, r, g, b, g, r, g, b.*

The "white" video signal at the terminal 120 is adapted for application to the beam intensity-controlling electron of the white gun 20 of the kinescope 10 in Fig. 1. The terminal 120 is, therefore, designated for connection via a delay means 162 to a terminal 164 which is adapted for connection to the terminal 164' in Fig. 1. Similarly, the color video signals from the terminal 160 are applied via delay means 166 to a terminal 168 which is designated for connection to the corresponding terminal 168' of Fig. 1. Disregarding the delay means 162 and 166, it will be understood that with the signals applied to the intensity control electrodes of the guns 20 and 22, the beam 28 will be modulated in intensity as it scans horizontally across the target 16, thereby producing a white image, the intensity of which corresponds to the intensity of the signal. At the same time, the chroma beam 24 will scan sinusoidally across the target 16 as shown in Fig. 2 to illuminate the red, green and blue phosphors successively and with an intensity proportional to that of the signals "*g*," "*r*" and "*b*." By virtue of the fact that the signal applied to the gun 20 is the lowest amplitude color signal and the signal applied successively to the gun 22 are equal to the difference between that signal and the representative color video signals, the ultimate image visible on the screen 16 will be a faithful reproduction, in color, of the original television subject.

The purpose of the delay devices 162 and 166 is as follows: if it be assumed to be preferable that the beams 28 and 24 strike the target screen as shown in Fig. 2 with the chroma beam spot 26 substantially centered on the white beam spot 30, the delay means 162 and 166 may be dispensed with, since the white and chroma signals will then be properly reconstructed together. Assuming, on the other hand, that by reason of manufacturing misalignment of the guns 20 and 22, for example, the beam spots 26 and 30 are not in coincidence as in Fig. 2 but that one beam leads the other in position, it is then desirable to delay the signal applied to the "lagging" beam so that the information which that beam reconstructs on the screen is in substantial coincidence with the information "laid down" by the "leading" beam. For a given tube 10, therefore, only one of the delay devices 162 and 166 is necessary, and that in the channel of the signal applied to the lagging beam. The delay device employed may be in the nature of an accurately cut transmission line or may be in the nature of a controllable electronic delay circuit such as that shown in U. S. Patent No. 2,321,335, granted June 8, 1943 to W. A. Tolson.

It may additionally be noted that although the invention has been described as being provided with signals in accordance with a form of apparatus shown in the above-cited Schroeder patent, that signal-deriving apparatus may be replaced by the apparatus shown in U.S. Patent No. 2,646,463, granted July 21, 1953 to Schroeder.

It should be borne in mind that, while the invention has been illustrated in accordance with a specific form in which the image-reproducing device is of the type having horizontally disposed phosphor strips, the principles of the invention are also applicable to other forms of tubes such, for example, as those in which the phosphor strips are arranged vertically. An example of such a tube is illustrated in U.S. Patent No. 2,545,325, granted March 13, 1951 to P. K. Weimer.

From the foregoing, it will be appreciated that the present invention affords relatively simple means for reproducing color television images, which means afford improved brightness of the resultant image and in such manner as to provide improved black-and-white image reproduction.

Having thus described my invention, what I claim as new and desire to secure by Letters Patent is:

1. Color television image-reproducing apparatus which comprises: a cathode ray tube having a target made up of a plurality of areas of respectively different preselected color light characteristics; means for producing and directing first and second electron beams in the same direction toward said target; means for causing said beams to scan said target; means for modulating the intensity of said first beam in accordance with the black-and-white information regarding a television image; and means for modulating the intensity of said second beam successively with information regarding said preselected colors of such image.

2. Color television image-reproducing apparatus which comprises: a cathode ray tube having a target made up of a plurality of groups of areas, the areas of each group having respectively different preselected component color light characteristics such that the areas of a given group are capable of emitting white light when that group is subjected to electron impingement; means for producing a first electron beam whose cross-sectional area at said target is commensurate with one of said target areas in at least one dimension thereof; and means for producing a second electron beam whose cross-sectional area at said target is of such size as to impinge simultaneously upon all of the target areas of one of said groups.

3. Color television image-reproducing apparatus which comprises: a cathode ray tube having a target made up of a plurality of groups of areas, the areas of each group having respectively different preselected component color light characteristics such that the areas of a given group are capable of emitting white light when that group is subjected to electron impingement; means for producing a first electron beam whose cross-sectional area at said target is commensurate with one of said target areas in at least one dimension thereof; means for producing a second electron beam whose cross-sectional area at said target is of such size as to impinge simultaneously upon all of the target areas of one of said groups; and means for causing said first and second beams to scan said target.

4. Color television image-reproducing apparatus which comprises: a cathode ray tube having a target made up of a plurality of areas of respectively different preselected color light characteristics; means for producing and directing first and second electron beams toward the same side of said target; means for causing said beams to scan said target; means for modulating the intensity of said first beam in accordance with the black-and-white information regarding a television image; and means for modulating the intensity of said second beam with information regarding said preselected colors of such image.

5. Color television image-reproducing apparatus which comprises: a cathode ray tube having a target made up of a plurality of areas of respectively different preselected color light characteristics; means for producing and directing first and second electron beams toward said target; means for causing said beams to scan said target; means for modulating the intensity of said first beam in accordance with the black-and-white information regarding a television image; and means for modulating the intensity of said second beam successively wtih information regarding said preselected colors of such image; said first beam being of larger cross-sectional area than said second beam.

6. Color television image-reproducing apparatus which comprises: a cathode ray tube having a target made up of a plurality of areas of respectively different preselected color light characteristics; means for producing and directing first and second electron beams toward said target; means for causing said beams to scan said target; means for modulating the intensity of said first beam in accordance with the black-and-white information regarding a television image; and means for modulating the intensity of said second beam successively wtih information regarding said preselected colors of such image, said first beam being of such cross-sectional dimension as to impinge simultaneously upon areas of all of the different preselected color light characteristics and said second beam being of such cross-sectional dimension as to be capable of striking a single one of such areas at a given instant.

7. Color television image-reproducing apparatus which comprises: a cathode ray tube having a target made up of a plurailty of groups of areas, the areas of each group having respectively different preselected component color light characteristics such that the areas of a given group are capable of emitting white light when that group is subjected to electron impingement; means for producing a first electron beam whose cross-sectional area at said target is commensurate with one of said target areas in at least one dimension thereof; means for producing a second electron beam whose cross-sectional area at said target is of such size as to impinge simultaneously upon all of the target areas of one of said groups; means for modulating the intensity of said second beam with information regarding the black-and-white content of a television image; means for modulating the intensity of said first beam successively with information regarding said respectively different preselected component colors; means for causing said second beam to scan said target such that said beam continually impinges upon a group of such areas; and means for causing said first beam to traverse said areas of respectively different component color light characteristics successively such that said beam is in contact with an area of a preselected color characteristic during that interval in which its intensity is modulated by information regarding that preselected color.

8. Color television image reproducing apparatus which comprises: a cathode ray tube having a target made up of a plurality of groups of areas, the areas of each group having respectively different preselected component color light characteristics such that the areas of a given group are capable of emitting white light when that group is subjected to electron impingement; means for producing a first electron beam whose cross-sectional area at said target is of such size as to impinge simultaneously upon all of the target areas of one of said groups; means for producing a second electron beam whose cross-sectional area at said target is commensurate with one of said target areas in at least one dimension thereof; means for causing said first and second beams to scan said target; a source of a plurality of component color television signals whose amplitudes are respectively representative of the component colors of an image to be produced; means for applying signals from said source to said cathode ray tube for modulating said first beam with a signal whose amplitude is no greater than that of any of said component color signals and means for modulating said second beam sequentially with signals respectively proportional to the amplitude difference between said component color signals and the signal applied to said first beam.

References Cited in the file of this patent

UNITED STATES PATENTS

| | | |
|---|---|---|
| 2,516,314 | Goldsmith | July 25, 1950 |
| 2,545,974 | Schroeder | Mar. 20, 1951 |
| 2,646,463 | Schroeder | July 21, 1953 |
| 2,671,129 | Moore | Mar. 2, 1954 |
| 2,677,723 | McCoy | May 4, 1954 |
| 2,681,381 | Creamer | June 15, 1954 |
| 2,684,995 | Schroeder | July 27, 1954 |
| 2,742,531 | Partin | Apr. 17, 1956 |